US010048702B1

(12) United States Patent
Florence et al.

(10) Patent No.: US 10,048,702 B1
(45) Date of Patent: Aug. 14, 2018

(54) CONTROLLED FLUID INJECTION TO REDUCE POTENTIAL SEISMIC ENERGY ALONG FAULT LINES

(71) Applicant: International Business Machines Corporation, Armonk, NY (US)

(72) Inventors: Christopher R. Florence, Raleigh, NC (US); Eric B. Libow, Raleigh, NC (US); Jordan T. Moore, Raleigh, NC (US); Walker L. Sherk, Raleigh, NC (US); Thomas S. Wallace, Hillsborough, NC (US); Pu Yang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/434,515

(22) Filed: Feb. 16, 2017

(51) Int. Cl.
*E21B 47/00* (2012.01)
*G05D 7/06* (2006.01)
(Continued)

(52) U.S. Cl.
CPC ............ *G05D 7/0617* (2013.01); *E02D 3/00* (2013.01); *E21B 43/26* (2013.01); *E21B 47/0003* (2013.01); *G01V 1/28* (2013.01)

(58) Field of Classification Search
CPC .... G05D 7/0676; G05D 7/0617; G01V 1/288; G01V 1/28; G01V 2210/1234;
(Continued)

(56) References Cited

U.S. PATENT DOCUMENTS 5,377,104 A * 12/1994 Sorrells ............... E21B 41/0057
702/11
2006/0047431 A1 3/2006 Geiser
(Continued)

FOREIGN PATENT DOCUMENTS

CN 1062419 * 7/1992
CN 1062419 A 7/1997
(Continued)

OTHER PUBLICATIONS

MacGarr, A., Bekins, B., Burkardt, N., Dewey, J., Earle, P., Ellsworth, W., Ge, S., Hickman, S., Holland, A., Majer, E., Rubinstein, J., Sheehan, A., "Coping with earthquakes induced by fluid injection", Feb. 2015, Published by AAAS, vol. 347 Issue 6224, pp. 830-831 (Year: 2015).*
(Continued)

*Primary Examiner* — Carib A Oquendo
(74) *Attorney, Agent, or Firm* — Scully, Scott, Murphy & Presser, P.C.; Reza Sarbakhsh

(57) ABSTRACT

Controlling release of earthquake energy, in one aspect, may include a controller device injecting fluid into bore holes at dynamically regulated levels to cause controlled seismic events. The bore holes are placed along a fault line with a potential for hazardous earthquakes, and installed with sensors and fluid flow controls communicating with the controller device. The seismic events caused by injecting the fluid are monitored via the sensors. Based on the monitoring, the injecting of the fluid to one or more of the bore holes may be regulated dynamically to control the sizes of the seismic events along the fault line.

15 Claims, 5 Drawing Sheets

(51) Int. Cl.
*E02D 3/00* (2006.01)
*G01V 1/28* (2006.01)
*E21B 43/26* (2006.01)

(58) Field of Classification Search
CPC .......... G01V 1/306; G01V 1/008; E02D 3/00; E21B 43/26; E21B 47/00; E21B 49/008
See application file for complete search history.

(56) References Cited

U.S. PATENT DOCUMENTS

| | | |
|---|---|---|
| 2009/0188665 A1 | 7/2009 | Tubel et al. |
| 2009/0299637 A1* | 12/2009 | Dasgupta ............... G01V 1/008 702/12 |
| 2009/0312950 A1* | 12/2009 | Jin .......................... G01V 1/008 702/15 |
| 2013/0175030 A1 | 7/2013 | Ige et al. |
| 2013/0220598 A1 | 8/2013 | Palumbo et al. |
| 2014/0039800 A1 | 2/2014 | Kikuchi |
| 2015/0219779 A1 | 8/2015 | Deng et al. |

FOREIGN PATENT DOCUMENTS

| WO | 02073240 A1 | 9/2002 |
|---|---|---|
| WO | 2011022198 A1 | 2/2011 |
| WO | 2014185898 A1 | 11/2014 |

OTHER PUBLICATIONS

Underground Injection Control National Technical Workgroup U.S. Environmental Protection Agency, "Injection-Induced Seismicity from Class II Disposal Wells: Practical Approaches", Nov. 2014, all pages (Year: 2014).*

Xialong Sun, "A study of earthquakes induced by water injection in the changing salt mine area, SW China", Jan. 2017, Journal of Asian Earth Sciences, pp. 102-119 (Year: 2017).*

Crampin, S., et al., "A review of the current understanding of seismic shear-wave splitting in the Earth's crust and common fallacies in interpretation", Wave Motion, Jun. 2008, pp. 675-722, vol. 45, No. 6.

Gugliemi, Y., et al., "Seismicity triggered by fluid injection-induced aseismic slip", Science, Jun. 2015, 15 pages, vol. 348, Issue 6240.

Jahr, T., et al., "Tilt observations around the KTB-site/Germany: monitoring and modelling of fluid induced deformation of the upper crust of the earth", Dynamic Planet, Jan. 2007, pp. 467-472, vol. 130, Chapter 68.

* cited by examiner

CONTROLLED FLUID INJECTION TO REDUCE POTENTIAL SEISMIC ENERGY ALONG FAULT LINES

BACKGROUND

The present application relates generally to computers and computer applications, and more particularly to controlling seismic energy.

Seismic activity is difficult to predict, and the lack of warning time causes significant impact. Earthquakes build up potential over a long period of time, for example, decades before occurring. Beaches and mountain valleys, which may be populated, are often prone to significant seismic activity. Even with predictive measures little can be done to reduce the impact of an earthquake. Existing mechanisms thus far may provide damage mitigation but not prevention; they also do not reduce the magnitude of earthquakes. Existing mechanisms involve costly infrastructure, more expensive than conventional constructions, may not always be widely effective, and may not present a viable option for all locations.

BRIEF SUMMARY

A method and system of controlling release of earthquake energy may be provided. The method, in one aspect, may include a controller device injecting fluid into bore holes at dynamically regulated levels to cause controlled seismic events. In one aspect, the bore holes are placed along a fault line with a potential for hazardous earthquakes. In one aspect, the bore holes are installed with sensors and fluid flow control communicating with the controller device. The method may also include monitoring via the sensors the seismic events caused by injecting the fluid. The method may further include, based on the monitoring, controlling the injecting of the fluid to one or more of the bore holes to control sizes of the seismic events along the fault line.

A system of controlling release of earthquake energy, in one aspect, may include a controller device, for example, comprising at least one processor, injecting fluid into bore holes at dynamically regulated levels to cause controlled seismic events. The bore holes may be placed along a fault line with a potential for hazardous earthquakes. A sensor may be installed with each of the bore holes, the sensor communicating with the controller device. Fluid flow control may be installed with each of the bore holes, the controller device communicating with the fluid flow control. The controller device may monitor via the sensors the seismic events caused by injecting the fluid and further control the injecting of the fluid to one or more of the bore holes to control sizes of the seismic events along the fault line.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
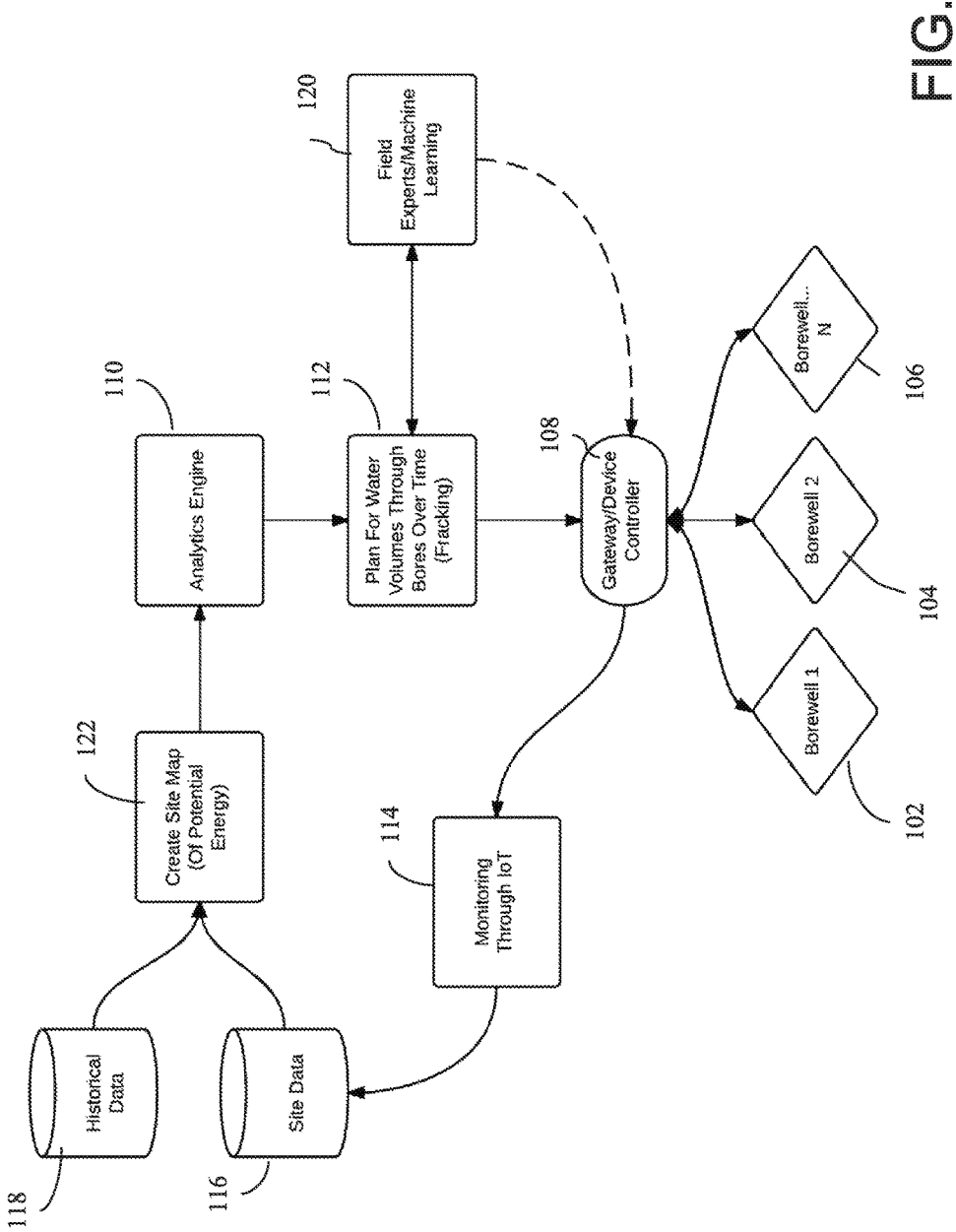
FIG. 1 is a diagram illustrating components of a system in one embodiment.
Figure 4:
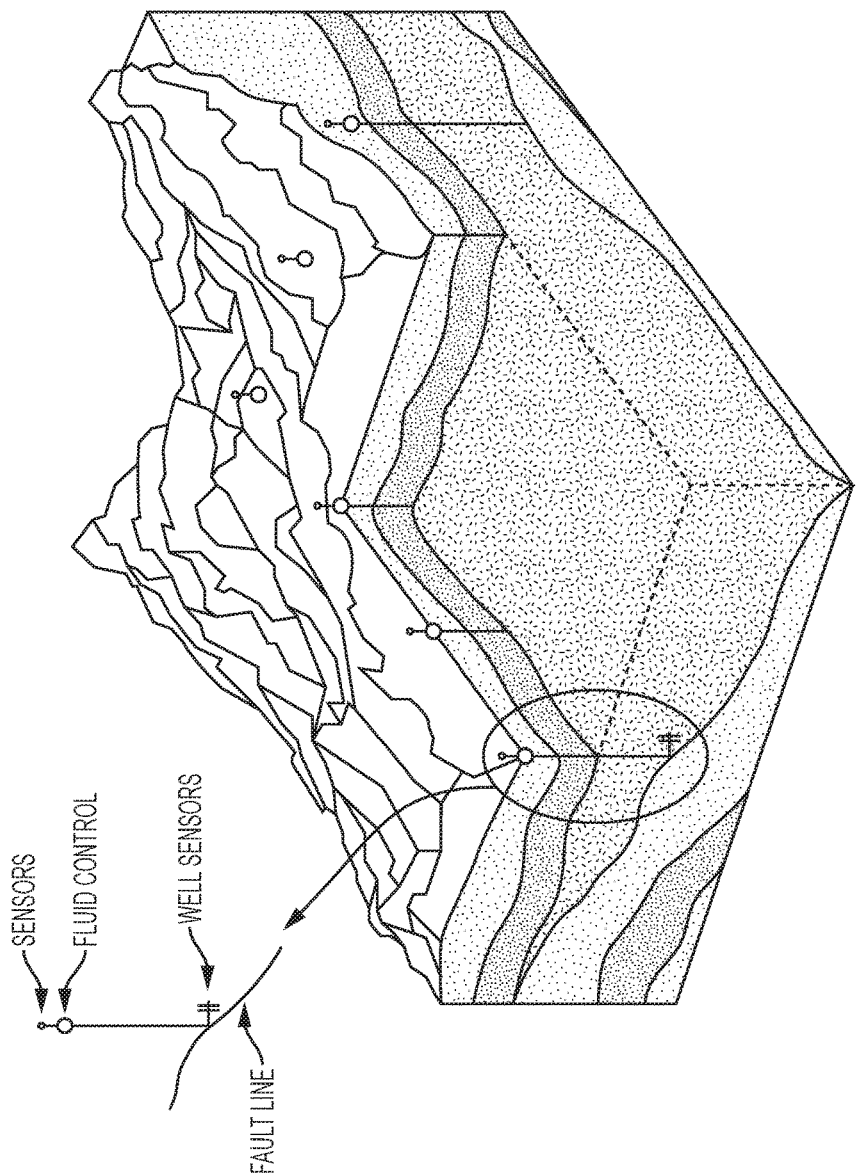
FIG. 4 shows an example of multiple bore holes drilled along a fault line

A method, system and technique are disclosed for controlling seismic activity. FIG. 1 is a diagram illustrating components of a system in one embodiment of the present disclosure. In some embodiments of the present disclosure, a method and/or system provides for controlled fluid injection to reduce potential seismic energy along fault lines. For example, a series of bore holes 102, 104, 106 are placed strategically along a fault line identified with a high potential for hazardous earthquakes, for example, an active fault, for example, for reducing potential energy. FIG. 4 shows an example of multiple bore holes drilled along a fault line. Fluid is injected into the bore holes at dynamically regulated levels to cause small controlled seismic events. In one embodiment, the desired range of value for flow rate, for dynamically regulating fluid levels, is calculated based on the impact on potential energy within the fault and keeping that change in energy within a range set, based on historical data and input from scientists. The flow rate is dynamically altered at runtime to ensure that the potential energy shifts stay within safe values.

A system may monitor the results from all actions and direct fluid flow to compensate for the actions. For example, controlling the fluid flow may be based on the processing of real time sensor observations. Actions and responses may be dynamic. The site conditions and system actions may be sent to observers, for example, for analysis. The system also drives future actions, for example, by controlling the fluid injections. In this way, potential energy that may have been built up over a period of time, e.g., decades can be safely diffused, and may prevent a catastrophic event occurring at an unknown time in the future.

The system and/or method in some embodiments may start with an area with sufficient potential for earthquakes. Such an area may have been previously identified. In this area, a series or blanket of bore wells 102, 104, 106 are drilled and devices associated with the system and/or method of the present disclosure are installed.

The devices are linked to a controller 108 and an analytics engine 110 coupled to the controller assesses the environment of the area. The energy density of the site is identified. For instance, energy density may be measured by using seismograph, decibel analysis post injections soil analysis of slippage, data/noise of drill, and/or others. After identifying the energy density of the site, the analytics engine 110 may be leveraged to produce a regimen of fluid flow control along with heat maps of the data provided. The energy density in one embodiment may be identified by a ground penetrating radar, which generates images of subsurface based on detecting reflected signals from subsurface structures, in combination with a series of seismographic readings. An example of this process may include taking an analysis of the energy density (e.g., and their rate of change) and from it creating a prescribed injection for each bore well. The prescribed injection may be reviewed manually. In one embodiment, the injection makes the energy level homogenous and simultaneously reduces the amount of potential energy. Water may be sufficient as a lubricant or injection fluid, but all manner of options may exist.

The system and/or method may use a series of wells and controllable amounts of fluid flow to enable fault regions to slip without causing large earthquakes. Each well 102, 104, 106 contains sensors for monitoring fluid flow, fluid volume, seismic activity, slip speed, slip direction, and decibels. The wells 102, 104, 106 also have fluid flow controls and a wired or wireless link to a controller/gateway 108. In some embodiments, the gateway 108 is responsible for relaying the data present to the analytics engine 110 and taking the resulting commands from the analytics engine 110 and engaging the fluid control on each well 102, 104, 106. The analytics engine 110 may be situated remotely from the controller/gateway 108 or locally with the controller/gateway 108.

As the system is engaged, the analytics engine 110 is tasked with evaluating its procedures on real world effects and adapting to events which were not within the goals of the procedure. In some embodiments, the analytics engine 110 produces heat maps of potential, viscosity, seismic events, liquid, and motion, based on the information or data received from the sensors contained in the wells. For instance, a heat map is created by the analytics engine 110, based on the potential energy data. This data is gathered by several sensors monitoring data across the environment. These maps are sent through to observers and/or the system itself. For example, the maps may be transmitted to another computer system and/or used as a feedback to the system.

The system's process may be iterative, for example, that includes a continual analysis of action (e.g., by the analytics engine 110), observation and reaction (e.g., by the controller device 108) until the goal of significantly reducing the potential for a dangerous earthquake is achieved. The reduction of potential may be based on whether the reduced potential meets a defined threshold value, which may be configurable. For example, the desired levels of potential energy for success may be set, for example, as determined by scientist and/or experts, and/or for example, by historical data of seismic activity and potential energy of other areas. This historical data can be used to identify thresholds for areas that are not susceptible to earthquakes and to determine the dangerous levels of seismic activity. In one aspect, goal of significantly reducing the potential for a dangerous earthquake may be determined to have been achieved, for example, responsive to detecting that there are no significant differences in potential energy that are outside of safe normal levels, that would not pose a threat of creating a potentially dangerous earthquake. In this way, seismic events may be deliberately and safely caused to occur. The system incorporates injection of fluid with multiple bore wells and interactions between the series of bore wells and the topography underground, for example, interaction between actions and changes in the subsurface conditions. The system may dynamically observe changes in subsurface conditions, and include a predictive element that drives future actions. The system identifies conditions as they change in response to the input fluid.

The analytics engine 110 may produce a plan 112 for water volumes to be injected through bores over time. For instance, the energy density may be measured by using seismograph, decibel analysis post injections soil analysis of slippage, data/noise of drill, and/or others. An example of identifying the energy density in one embodiment may employ a ground penetrating radar, which generates images of subsurface based on detecting reflected signals from subsurface structures, in combination with a series of seismographic readings. After identifying the energy density of the site, the analytics engine 110 may be leveraged to produce a regimen of fluid flow control along with heat maps of the data provided. An example of this process may include taking an analysis of the energy density (e.g., and their rate of change) and from it creating a prescribed injection for each bore well. The prescribed injection may be reviewed manually. The plan 112, for example, in a form of signals are transmitted to the controller device 108 for controlling the fluid injection into the bore holes 102, 104, 106.

In addition, site data around the area of the bore holes 102, 104, 106 may be monitored, for example, via Internet of Things (IoT) 114 and stored in a storage device 116. The site data stored in the storage device 116 along with historical data associated with the site or the area of the bore holes 102, 104, 106 stored in a database of historical data 118 are used to create a site map (also referred to as heat map) comprising potential energy 122. The site map or heat map may be created based on sensor data. Known fault areas also have seismic data that may be used create the site map.

The analytics engine 110 uses the site map of potential energy 122 to plan for water or fluid volume 112.

A machine learning component 120 may train a machine learning model to learn to automatically plan for the water volume 112. Injections (e.g., their injection rates, volume, depth and type of fluid injected) may be recorded and the effect on seismic activity and the slippage (e.g., direction, volume, noise, and area effected) may be recorded. This injection to output may be correlated, e.g., under the supervision of domain expert knowledge and used to reproduce results when desired.

The machine learning component may be responsible for analyzing the status of the fault line and prescribing an approach to reducing potential energy in real time.

Figure 2:
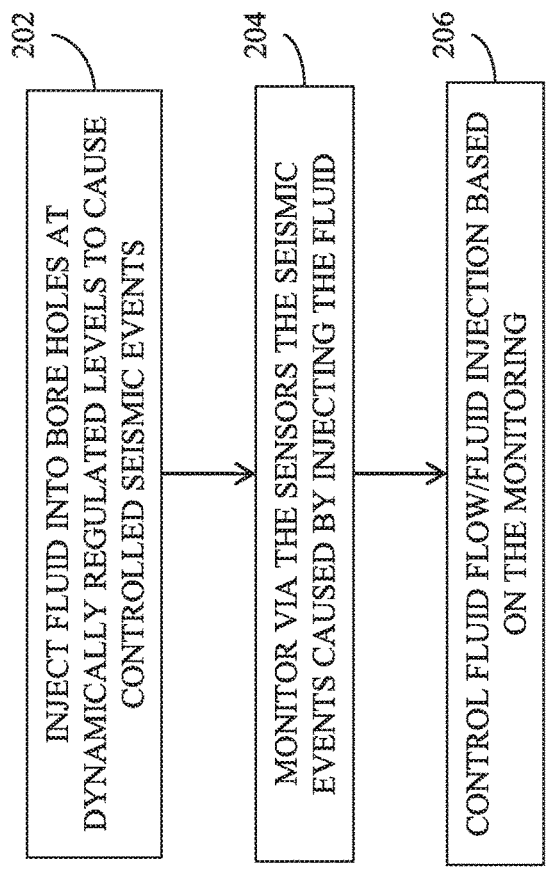
FIG. 2 is a flow diagram illustrating a method of the present disclosure in one embodiment.

FIG. 2 is a flow diagram illustrating a method of controlling release of earthquake energy in one embodiment of the present disclosure. The method in one embodiment may prescribe action, adapt to results, and respond to dissipate energy. At 202, a controller device injects fluid into bore holes at dynamically regulated levels to cause controlled seismic events. The bore holes are placed along a fault line with a potential for hazardous earthquakes. The bore holes are installed with sensors and fluid flow control communicating with the controller device. The sensors and the fluid flow controls communication via one or more of wired and wireless communications.

At 204, the controller device monitors via the sensors the seismic events caused by injecting the fluid, and may direct fluid flow to one or more of the bore holes via the fluid flow controls to control sizes of the seismic events along the fault line. For instance, an analytics engine may receive monitored data and plan for next fluid injection or the volume of the fluid flow to one or more of the bore holes such that the potential for hazardous earthquake is dissipated At 206, based on the monitoring, the injecting of the fluid or fluid flow may be controlled. For example, the levels of injection may be dynamically regulated based on the monitoring so that sizes of the seismic events along the fault line are controlled.

For example, the controller device may monitor the seismic events caused by injecting the fluid by receiving sensor data from the sensors associated with the bore wells and relay the data to an analytics engine. The analytics engine evaluates the sensor data to produce a heat map. The heat map may include or specify energy potential, viscosity, seismic events, liquid, and motion surrounding an area of the fault line. The heat map may be a 3-dimensional graphical map, which may be displayed on a user interface device. The heat map may be further transmitted to another processing component for further analysis and/or observation.

The monitoring may also include monitoring site data associated with the area of the fault line via Internet of Things (IoT). The analytics engine evaluates the site data with the sensor data to produce the heat map.

Based on the heat map and or a signal from the analytics engine, the controller device activates or deactivates the fluid flow to the one or more bore holes and controls volume of fluid to the one or more bore holes.

In one aspect, the volume of fluid to control is determined based on machine learning. For instance, a machine is trained to learn and predict the volume based on the sensor data and the site data. The machine may be retrained periodically based on updated sensor data and/or updated site data received responsive to the controller device continuing the monitoring. In one aspect, the machine may retrain itself autonomously based on the sensor data and/or site data, for example, periodically at a defined interval. In another aspect, the machine may train itself autonomously responsive to detecting a change in the sensor data and/or site data that exceeds a defined threshold.

The following describes a use case scenario in one embodiment of the present disclosure. Consider a fault line with the Earth's crust in a region. Consider in this region that the Costal plate runs to the North West while the continental plate moves to the South East. To alleviate the potential energy in this region, a series of bores may be drilled into the earth along the fault. Since fault can be represented as a plane in a local perspective, a grid of boreholes may be created. Sensors may be included with each borehole and the system and/or method of the present disclosure may monitor for seismic activity, vibration, sound, and other various data. A heat map of the potential energy may be generated by testing the local conditions at each bore, for example, based on identifying the energy density at the sites. This can be accomplished with a small amount of fluid, or potentially using historical seismic data. The seismic responses to injecting amounts of fluid at each bore may also be monitored from readings on a seismometer. Once a three dimensional topographic heat map has been created using the sensor data and common mathematical models, the system and/or method of the present disclosure may apply a procedure to begin facilitating the plates to slip along the fault. For example, fluid can be injected in each individual well along the areas which have the least amount of energy. Once the potential energy in those regions is reduced, the system and/or method in the present disclosure may continue to slowly or incrementally reduce the potential energy at the regions which contain the most energy. By analyzing the heat map dynamically, the system and/or method in the present disclosure may be able to ensure that there is no place with a significant difference in potential energy along the fault plane. By controlling how the plates slip against each other, the system and/or method in the present disclosure may be able to reduce the potential energy in the area and prevent the buildup of high magnitude earthquakes. Controlling the fluid, controls the slip, which in turn controls the movement of a plate, which will dissipate the energy density. In one aspect, this slip will not induce earthquakes, and will be a planned event. While the system executes the procedure, the sensor data allows for real-time monitoring and continuous adjustments. Safety thresholds prevent any excessive movement under the earth. The system can then be left in place to continue monitoring the fault line, and may be used again after sufficient potential energy has built up.

Figure 3:
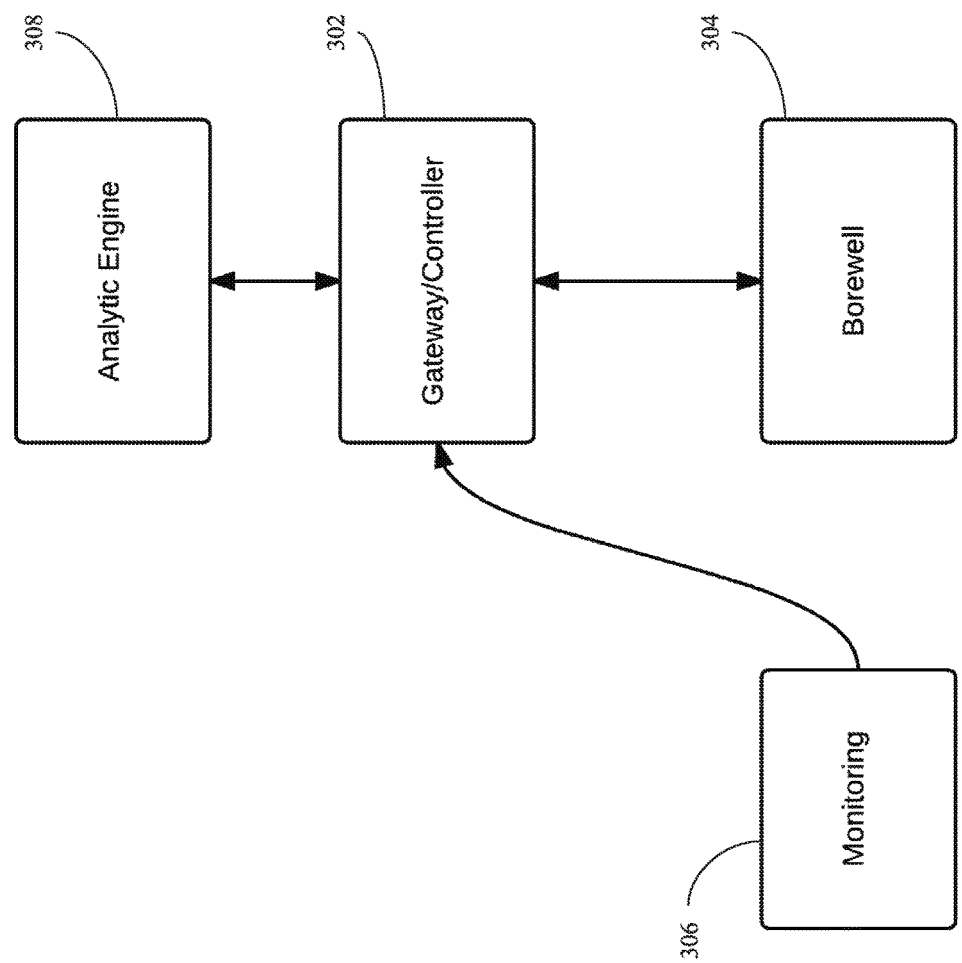
FIG. 3 is another diagram showing components of a system in one embodiment of the present disclosure.

FIG. 3 is another diagram showing components of a system in one embodiment of the present disclosure. A controller device 302 injects fluid into bore holes 304 at dynamically regulated levels to cause controlled seismic events. For instance, as described with reference to FIG. 1, in one embodiment, the desired range of value for flow rate, for dynamically regulating fluid levels, may be calculated based on the impact on potential energy within the fault and keeping that change in energy within a range set, based on historical data and input from scientists. A controller device 302 may include a computer or hardware processor. For example, bore holes (e.g., 304) are placed along a fault line with a potential for hazardous earthquakes. A sensor is installed with each of the bore holes, for example, a bore hole shown at 304, and communicates with the controller device 302. Fluid flow control or the like device may be installed with each of the bore holes for example, a bore hole shown at 304. The controller device 302 communicates with the fluid flow control, for example, to control the volume of the fluid flowing to a bore hole (e.g., 304).

Monitoring component 306 may include one or more sensors associated with or installed with the bore hole 304 that send signals to the controller device 302, the signals representing data such as fluid flow, fluid volume, seismic activity, slip speed, slip direction, and decibels. In one embodiment, the signals are compared to a model (e.g., determined from historical data) that includes a range of values associated with those signals for producing the desired slippage, altering the flow rates so that the signals received from the sensors at the bore hole are within the range of the model values. In one aspect, the model may include a mathematical construct that acts as a simulation of the mechanics. The model may be based on experiments and algorithmic approximation on historical data. The model may be an approximation that uses the same variables and constants that the system of the present disclosure may leverage in the real world. In essence the model is comprised of a mathematical approximation whose constants are built with experiments and applications of physical principles. The controller device 306 monitors via the sensors the seismic events caused by injecting the fluid and further controls the injecting of the fluid to one or more of the bore holes to control the magnitude of slippage along the fault line by controlling or limiting slippage through fluid injection. For example, the controller device 302 may communicate the sensor data to an analytics engine 308. The analytics engine 308 may determine energy density in the bore hole areas and plan a volume of fluid flow to the bore hole 304.

The monitoring component 306 may also include monitoring via Internet of Things (IoT), site data associated with the area of the fault line. The analytics engine 308 may evaluate the site data with the sensor data to plan the volume of fluid flow to the bore hole 304.

The controller device 302, the sensor and the fluid flow control may communicate via at least one of wired and wireless communications. The controller device 302 and the analytic engine 308 may reside in a same processor, or separate processors communicating via at least one or wired and wireless communications.

Figure 5:
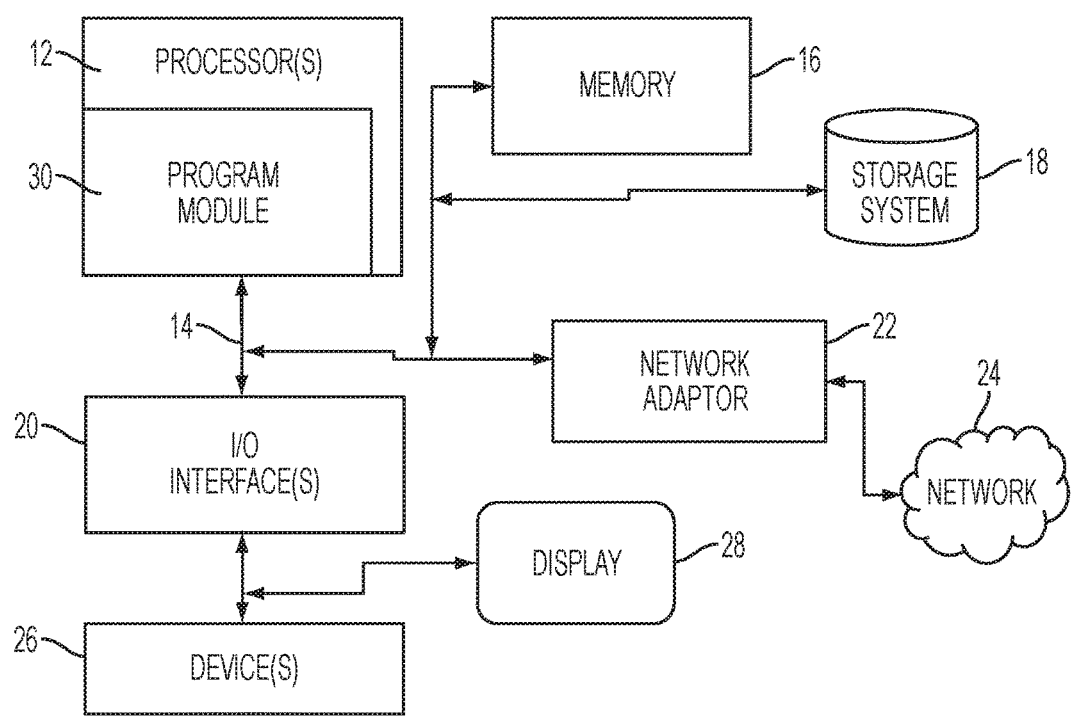
FIG. 5 illustrates a schematic of an example computer or processing system that may implement a controlled fluid injection system in one embodiment of the present disclosure.

FIG. 5 illustrates a schematic of an example computer or processing system that may implement a controlled fluid injection system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of controlling release of earthquake energy, comprising:

a controller device injecting fluid into bore holes at dynamically regulated levels to cause controlled seismic events, the bore holes placed along a fault line with a potential for hazardous earthquakes, the bore holes installed with sensors and fluid flow control communicating with the controller device;

monitoring via the sensors the seismic events caused by injecting the fluid; and based on the monitoring, controlling the injecting of the fluid to one or more of the bore holes to control sizes of the seismic events along the fault line, wherein the monitoring the seismic events caused by injecting the fluid further comprises the controller device receiving real time sensor data from the sensors and relaying the data to an analytics engine, the analytics engine evaluating the sensor data to produce a heat map comprising energy potential, viscosity, seismic events, liquid, and motion surrounding an area of the fault line, and wherein, the controlling the injecting of the fluid comprises, based on the heat map, the controller device controlling volume of fluid to the one or more bore holes, wherein flow of the fluid is controlled based on processing of the real time sensor data wherein actions and responses are dynamic.

2. The method of claim 1, wherein the controller device activating or deactivating the fluid flow to the one or more bore holes.

3. The method of claim 1, wherein the controller device monitoring the seismic events caused by injecting the fluid further comprises monitoring site data associated with the area of the fault line via Internet of Things (IoT), wherein the analytics engine evaluates the site data with the sensor data to produce the heat map.

4. The method of claim 1, wherein the volume of fluid to control is determined based on machine learning, wherein a machine is trained to predict the volume based on the sensor data and the site data, and wherein the machine is periodically retrained based on updated sensor data and updated site data received responsive to the controller device continuing the monitoring.

5. The method of claim 1, wherein the controller device, the sensors and the fluid flow controls communicate via at least one of wired and wireless communications.

6. A computer readable storage medium storing a program of instructions executable by a machine to perform a method of controlling release of earthquake energy, the method comprising:
   a controller device injecting fluid into bore holes at dynamically regulated levels to cause controlled seismic events, the bore holes placed along a fault line with a potential for hazardous earthquakes, the bore holes installed with sensors and fluid flow control communicating with the controller device;
   monitoring via the sensors the seismic events caused by injecting the fluid; and
   based on the monitoring, controlling the injecting of the fluid to one or more of the bore holes to control sizes of the seismic events along the fault line,
      wherein the monitoring the seismic events caused by injecting the fluid further comprises the controller device receiving real time sensor data from the sensors and relaying the data to an analytics engine,
      the analytics engine evaluating the sensor data to produce a heat map comprising energy potential, viscosity, seismic events, liquid, and motion surrounding an area of the fault line, and wherein,
      the controlling the injecting of the fluid comprises, based on the heat map, the controller device controlling volume of fluid to the one or more bore holes,
      wherein flow of the fluid is controlled based on processing of the real time sensor data wherein actions and responses are dynamic.

7. The computer readable storage medium of claim 6, wherein the controller device activating or deactivating the fluid flow to the one or more bore holes.

8. The computer readable storage medium of claim 7, wherein the controller device monitoring the seismic events caused by injecting the fluid further comprises monitoring site data associated with the area of the fault line via Internet of Things (IoT), wherein the analytics engine evaluates the site data with the sensor data to produce the heat map.

9. The computer readable storage medium of claim 7, wherein the volume of fluid to control is determined based on machine learning, wherein a machine is trained to predict the volume based on the sensor data and the site data, and wherein the machine is periodically retrained based on updated sensor data and updated site data received responsive to the controller device continuing the monitoring.

10. The computer readable storage medium of claim 6, wherein the controller device, the sensors and the fluid flow controls communicate via at least one of wired and wireless communications.

11. A system of controlling release of earthquake energy, comprising:
   a controller device injecting fluid into bore holes at dynamically regulated levels to cause controlled seismic events, the bore holes placed along a fault line with a potential for hazardous earthquakes;
   a sensor installed with each of the bore holes, the sensor communicating with the controller device;
   fluid flow control installed with each of the bore holes, the controller device communicating with the fluid flow control;
   the controller device monitoring via the sensors the seismic events caused by injecting the fluid and further controlling the injecting of the fluid to one or more of the bore holes to control sizes of the seismic events along the fault line,
   an analytics engine coupled to the controller device, wherein the controller device receives real time sensor data from the sensors and relays the data to the analytics engine, the analytics engine evaluating the sensor data to produce a heat map comprising energy potential, viscosity, seismic events, liquid, and motion surrounding an area of the fault line, and the controller device controls volume of fluid to the one or more bore holes based on the heat map to control the injecting of the fluid, wherein flow of the fluid is controlled based on processing of the real time sensor data wherein actions and responses are dynamic.

12. The system of claim 11, wherein the controller device activates and deactivates the fluid flow to the one or more bore holes based on the heat map to control the injecting of the fluid.

13. The system of claim 12, wherein the analytics engine evaluates site data associated with the area of the fault line monitored via Internet of Things (IoT) with the sensor data to produce the heat map.

14. The system of claim 13, wherein the volume of fluid to control is determined based on machine learning, wherein a machine is trained to predict the volume based on the sensor data and the site data, and wherein the machine is periodically retrained based on updated sensor data and updated site data received responsive to the controller device continuing the monitoring.

15. The system of claim 11, wherein the controller device, the sensor and the fluid flow control communicate via at least one of wired and wireless communications.

\* \* \* \* \*